US00RE34022E

United States Patent [19]

Davis

[11] E Patent Number: Re. 34,022

[45] Reissued Date of Patent: Aug. 11, 1992

[54] REINFORCING MEMBER FOR WOODEN STRUCTURE

[75] Inventor: Roy E. Davis, Anderson, Ind.

[73] Assignee: Better Building Products, Inc., Nashville, Tenn.

[21] Appl. No.: 300,014

[22] Filed: Jan. 17, 1989

Related U.S. Patent Documents

Reissue of:

[64] Patent No.: 4,637,195
Issued: Jan. 20, 1987
Appl. No.: 809,314
Filed: Dec. 16, 1985

[51] Int. Cl.[5] ..... E04C 3/32

[52] U.S. Cl. ..... 52/693; 52/657; 52/696; 52/720

[58] Field of Search ..... 52/693, 695, 696, 317, 52/657, 720, 732

[56] References Cited

U.S. PATENT DOCUMENTS

| | | | |
|---|---|---|---|
| 1,867,449 | 7/1932 | Eckert et al. | 52/317 X |
| 1,924,881 | 8/1933 | Ragsdale | 52/693 X |
| 2,964,807 | 12/1960 | Kennedy | 52/693 X |
| 3,332,196 | 7/1967 | Tuttle | 52/693 |
| 3,335,993 | 8/1967 | Tuttle | 52/696 X |
| 3,503,173 | 3/1970 | Jureit | 52/693 X |
| 4,016,698 | 4/1977 | Rogers | 52/656 |
| 4,246,736 | 1/1981 | Kovar et al. | 52/696 |

OTHER PUBLICATIONS

A Manual of Wood Framing, TECO Publication No. 143, pp. 1, 2, 5, 8 (1978).

Kant-Sag Distributor Price List, U.S. Steel Products Co., USPC No. 104C pp. 9, 10 (1980).

*Primary Examiner*—Richard E. Chilcot, Jr.
*Attorney, Agent, or Firm*—Lyon & Lyon

[57] ABSTRACT

A structural member for bracing adjacent wooden studs of a wall frame comprised of an elongated body portion having mounting portions at the ends thereof, which mounting portions include outwardly facing end surfaces generally parallel to each other and oblique to the body portion, side surfaces perpendicular to and laterally offset from the end surfaces, and means for forming a third surface facing and parallel to the first surface wherein three surface engagement between the structural member and the stud is provided.

5 Claims, 3 Drawing Sheets

REINFORCING MEMBER FOR WOODEN STRUCTURE

Matter enclosed in heavy brackets [ ] appears in the original patent but forms no part of this reissue specification; matter printed in italics indicates the additions made by reissue.

BACKGROUND OF THE INVENTION

The present invention pertains to the art of residential building construction and, more particularly, to reinforcing components for wall sections. The present invention is particularly applicable for bracing upright studs in a wooden wall frame and will be described with particular reference thereto, although it will be appreciated that the invention has other, broader applications.

In the construction of residential buildings such as houses and apartment units, wood frame construction is conventially known. Walls are generally comprised of wooden frames formed of upright studs which are parallel to each other, and separated at predetermined spacing. It is likewise common to support or brace the exteiror corners against sagging, especially where the wall sections are joined, to increase the structural integrity of the dwelling.

Heretofore several methods for bracing stud walls have been known. Mortise wood braces are widely used for bracing stud walls. A mortise wood brace is generally comprised of a 1" by 4" wooden strip fitted into the upstanding studs and extending diagonally thereacross. Such a brace requires that rectangular grooves or slots be carefully cut in each stud so that the stud can accept the brace in a manner which maintains a flush outer surface.

In this respect, a flush outer surface on the wall frame is important in that sheets of insulation board (thermax) are normally secured or fixed to the stud wall frame prior to installing exterior siding. The mortise brace thus provides a wall frame having a flush outer surface on which sheet installation board can easily be secured. It will be appreciated however that cutting diagonal slots or grooves is very time consuming and labor intensive, and therefore very expensive.

Another conventionally known method of bracing a stud wall or corner section is by nailing plywood sheets (generally 4' by 8' sheets of ⅜" plywood) onto the portion of the wood frame to be braced. This arrangement provides a strong wall section but the plywood sheet does not permit sheets of insulations to be installed over such areas because covering the plywood with insulation board would produce a raised or higher surface as compared to the areas where plywood does not cover the wooden frame. Accordingly, when plywood sheet is used to brace a portion of the wall frame no insulation is used in the plywood covered area and thus the insulating properties of that portion of the wall are reduced. Further, with respect to plywood sheet bracing, openings such as windows and doors located in the portion of the wall frame to be braced require that the plywood sheet be cut, in the appropriate areas, to accomodate such openings. The cutting operation required for these openings, like the mortise brace, is labor and time consuming, and thus increases the cost of this method of bracing.

A still further method of wall bracing is disclosed in U.S. Pat. No. 4,016,698 to Rogers. This patent discloses a galvanized steel strap which is nailed diagonally to the studs of a wall frame with ends of the strap bent over and rigidly fastened to the upper and lower wall plates. Although the metal strap provides good tensile strength, it does not have comparable compressive strength. Likewise, the strap is not completely suitable where openings such as windows exist, in that both ends must be fastened to the top and bottom plates of a wall frame to provide maximum tensile strength. Thus the device disclosed in the Rogers patent is limited in its application to portions of wall frames which have no opening therein and is not suitable for other applications.

These and other problems are overcome by the present invention wherein a reinforcing member is provided for bracing a wooden frame structure which reinforcing member is sturdy, versatile, and easy to install.

SUMMARY OF THE INVENTION

In accordance with the present invention there is provided a reinforcing member for bracing adjacent wooden studs of a structural wall frame for residential homes or the like. The reinforcing member is comprised of an elongated generally straight body portion having stud mounting portions at the distal ends thereof. Each mounting portion includes an outward facing, generally flat first moutning surface for engaging a stud, wherein the mounting surface at one end of the structural member is generally parallel to the mounting surface at the other end of the member, and both first mounting surfaces are oblique with respect to the body portion. Perpendicular to each first mounting surface, there is provided a second mounting surface which is laterally offset to one side of the body portion, which second mounting surfaces are generally coplanar with respect to each other. Means are associated with said mounting portions for attachment of the member to the adjacent studs of the wall frame wherein the body portion of the member is generally situated between the adjacent studs, and within the wall surface defined by edges of such studs. More specifically, the reinforcing member is comprised of two elongated planar sections defining a body portion having an L-shaped cross-section. The ends of one planar section provide first mounting surfaces, and the ends of the other planar section provide second mounting surfaces.

Further in accordance with the present invention, means, associated with the mounting portions, are provided to effect a third mounting surface wherein the mounting portion engages a respective stud along three surfaces. In this respect, the ends of the second planar section extend beyond the first mounting surface a distance greater than the thickness of the respective stud wherein such end can be deformed to wrap around the stud.

A primary object of the present invention is to provide means for reinforcing a wooden frame structure.

Another object of the present invention is to provide a reinforcing member which can reduce the overall labor cost of a residential structure.

A further object of the present invention is to provide a reinforcing member which can maintain a flush outer wall surface upon which sheet material can be affixed.

A still further object of the present invention is to provide a reinforcing member as described above wherein such member engages three surfaces of the stud in a wrap around fashion.

These and other objects and advantages of the invention will become apparent from the following description of species thereof taken together with the accompanying drawings.

BRIEF DESCRIPTION OF THE DRAWINGS

The invention may take physical form in certain parts and arrangement of parts, preferred embodiments which will be described later in detail in the specification and illustrated in the accompanying drawings which form a part thereof and wherein.

DETAILED DESCRIPTION OF THE PREFERRED EMBODIMENTS

Figure 1:
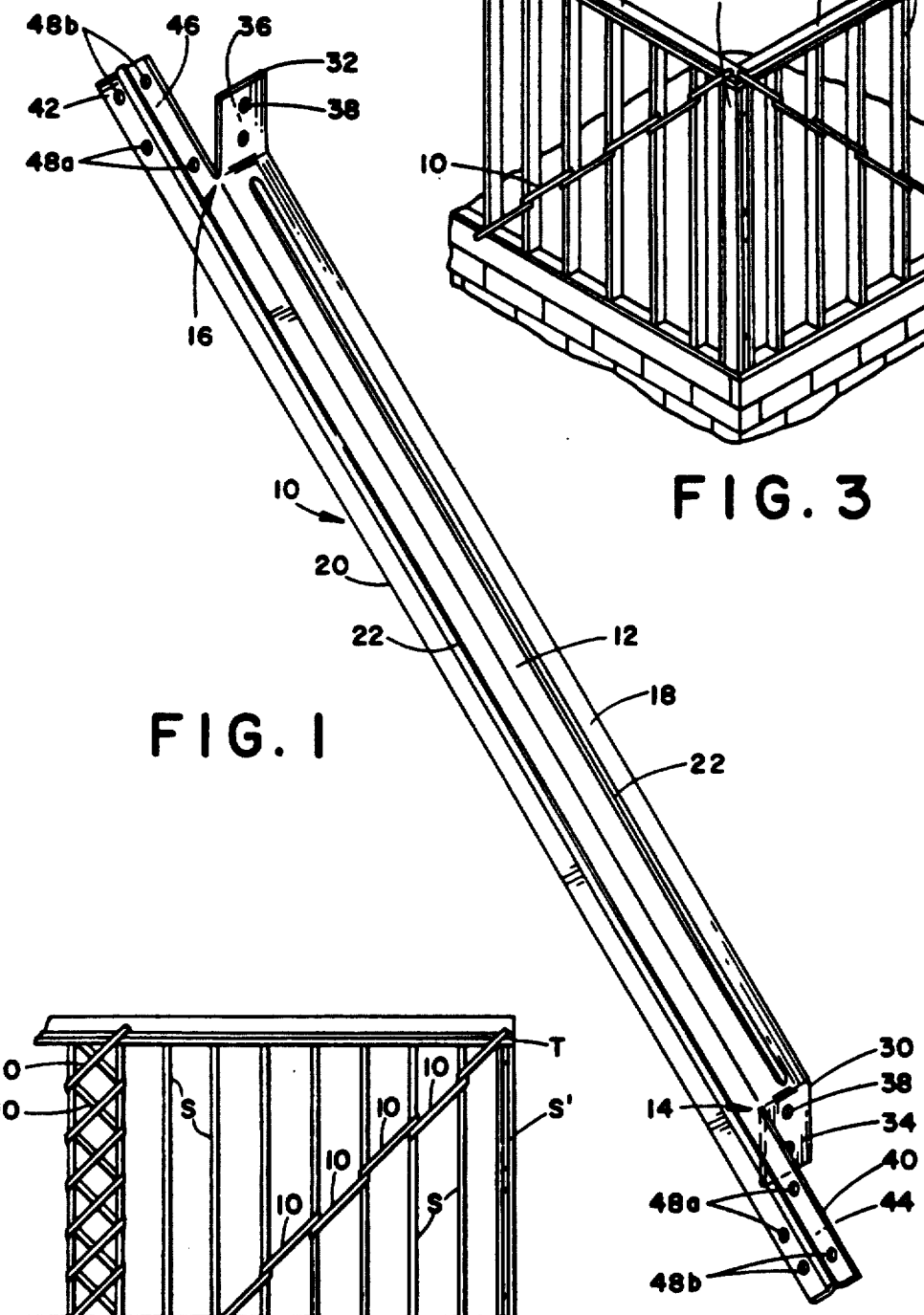
FIG. 1 is a perspective view of a wall frame stud reinforcing member illustrating a preferred embodiment of the present invention.

Referring now to the drawings wherein the showings are for the purpose of illustrating a preferred embodiment of the invention only and not for the purpose of limiting same, FIG. 1 shows a reinforcing member 10 comprised of a central body portion 12 having mounting portions 14, 16 at the opposite ends thereof. Body portion 12 is generally comprised of two elongated strip-like sections 18 and 20. Sections 18, 20 are generally flat and have a centrally located reinforcing rib 22 extending axially along the length thereof. Sections 18, 20 are perpendicular with respect to each other, and provide body portion 12 with an L-shaped configuration in cross-section. The distal ends of sections 18, 20 define the mounting portions of member 10. As seen in FIG. 1, the ends of section 18 are in the form of tabs 30, 32 which are bent obliquely with respect thereto. In the orientation shown, tab 30 is bent downwardly and tab 32 is bent upwardly in an opposite direction. Tabs 30, 32 define outwardly facing surfaces 34, 36 respectively. Surfaces 34, 36 are for engagement with the lateral surfaces of the adjacent studs. Aligned apertures 38 are provided on tabs 30, 32, which apertures are centrally located with respect thereto.

With respect to section 24, the ends thereof include strap-like portions 40, 42 which extend a predetermined distance beyond tab surfaces 34, 36. Strap portions 40, 42 define surfaces 44, 46 respectively. Surfaces 44, 46 are generally perpendicular to tab surfaces 34, 36, and are coplanar with respect to each other. As is shown in the drawings, strap surfaces 44, 46 face in the direction of planar section 18 and are laterally offset therefrom. Pairs of apertures 48a, 48b are disposed along the length of strap portions 40, 42.

Figure 2A:
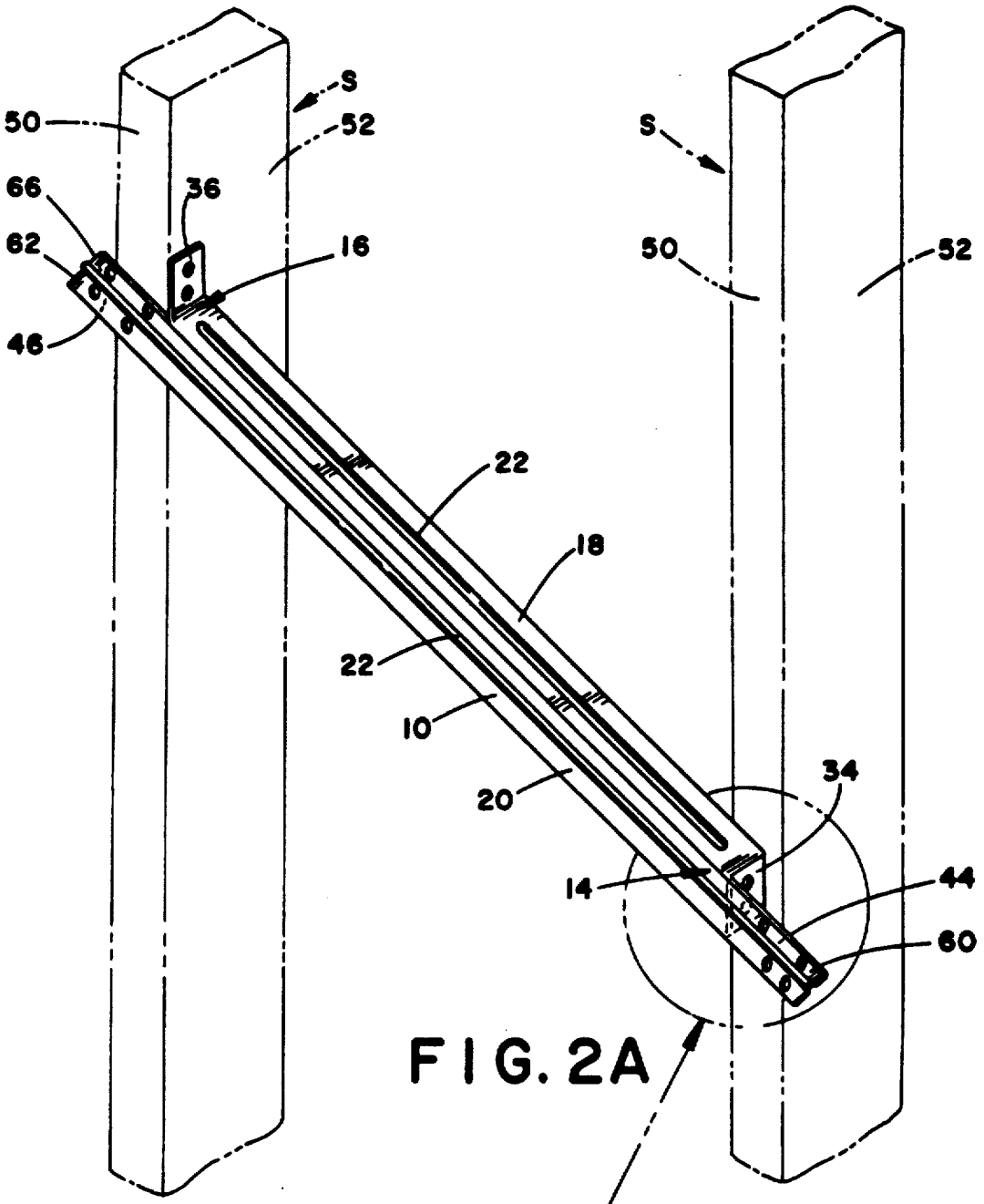
FIG. 2A is a perspective view showing an individual reinforcing member between two adjacent wall studs.
Figure 2B:
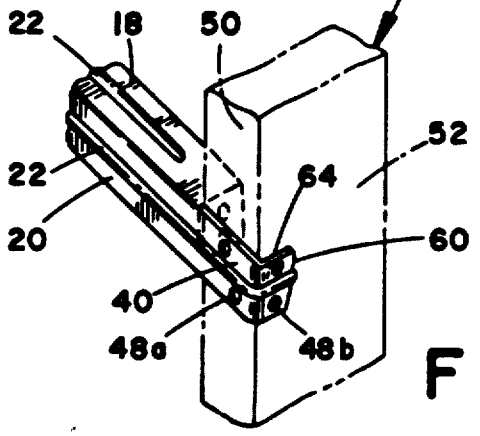
FIG. 2B is a partial view of the reinforcing member shown in FIG. 2A illustrating the configuration of the mounting portion when installed.

Referring now to FIG. 2A, reinforcing member 10 is shown between two adjacent studs S (shown in phantom) of a wooden wall frame. For the purposes of illustration, the edge surfaces of the studs, which edge surfaces define the wall surface, are designated 50, and the lateral or side edges of the studs are designated 52. Tab surfaces 34, 36 of reinforcing member 10 engage the opposite facing side surfaces 52 of the adjacent studs. In like manner, strap surfaces 44, 46 engage edge surfaces 50 of the studs. Reinforcing member 10 is secured to studs S by nails (not shown) driven through apertures 38 of tabs 30, 32, and apertures 48a of strap portions 40, 42. As seen in the drawings, apertures 38 on tabs 30 and 32 are generally aligned with reinforcing rib 22 of strip section 18 to insure loads are transmitted to the reinforced portion of member 10. In accordance with another aspect of the present invention, straps 40, 42 extend beyond tab surfaces 34, 36 a distance greater than the thickness of the studs. In other words, portions 60, 62 of straps 40, 42 overlap the edges of studs S as seen in FIG. 2A. In this respect, overlapping portions 60, 62 of straps 40, 42 can be deformed or bent to wrap around edge 50 of stud S as shown in FIG. 2B. In this bent or deformed configuration, portions 60, 62 of straps 40, 42 define surfaces 64, 66 respectively. Surfaces 64, 66 are generally parallel to end surfaces 34, 36 of tabs 30, 32. Nails driven through apertures 48b secure strap portion 60 to the stud. Accordingly, the reinforcing member engages, and is secured to, three sides of stud S. In this respect, the mounting portions 14, 16 of member 10 are of a generally U-shaped configuration.

Figure 2C:
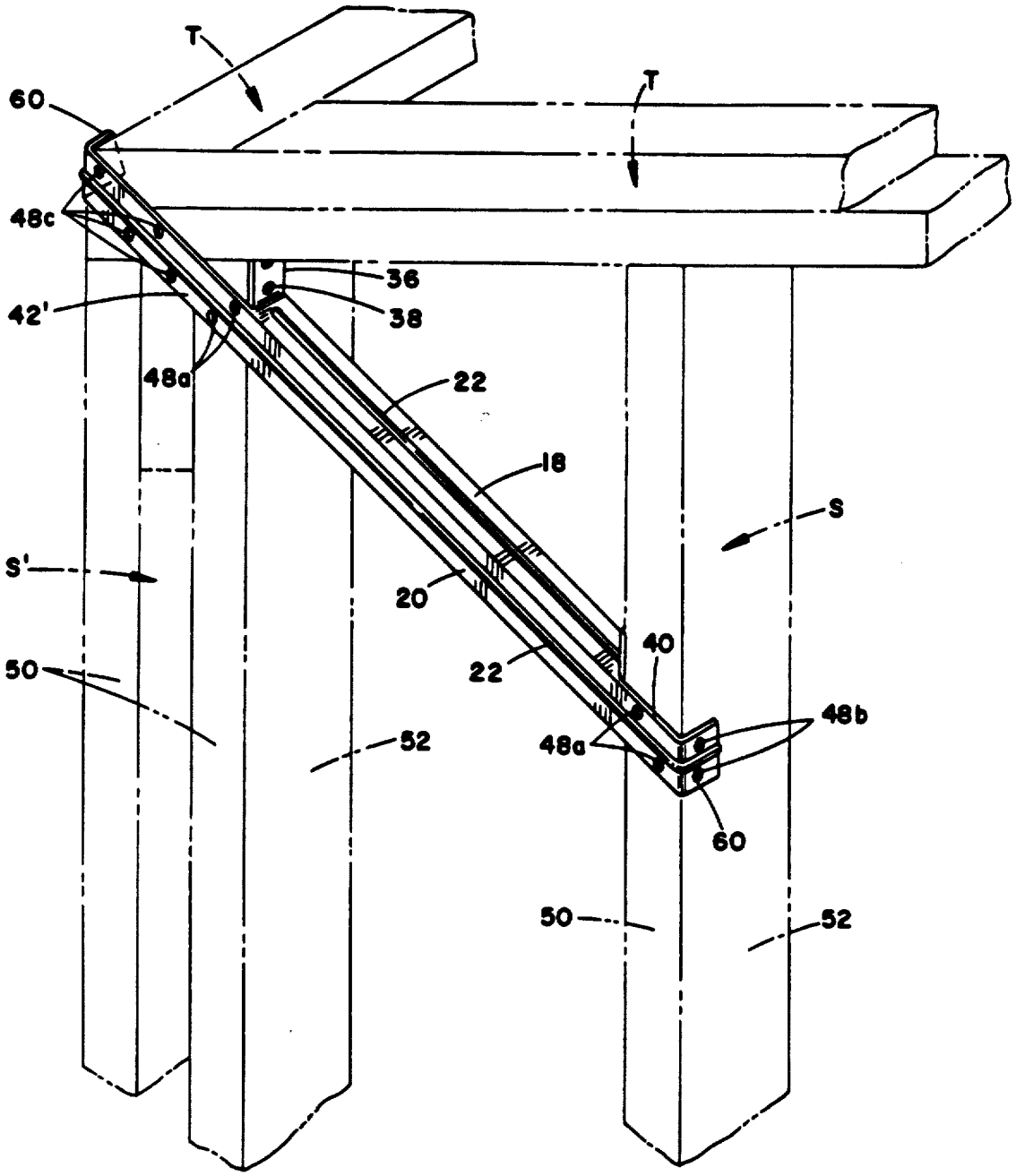
FIG. 2C is a perspective view of a wall frame stud reinforcing member illustrating an alternate embodiment of the present invention for bracing a double end wall stud with a single wall stud.

FIG. 2C shows a wall frame corner structure (shown in phantom) comprised of a wall stud S, a corner stud S', and a wall top plate T. Also shown is a modification to member 10 for bracing such corner structure. To accommodate the increased thickness of corner stud S', the length of the left hand strap portion, designated 42', is increased an amount sufficient to enable such portion to traverse the edge surfaces of stud S' and plate T, and to wrap around the corner formed thereby. Additional apertures 48c allow nailing of the strap portion to stud S' and plate T. Strap 42' shown in FIG. 2C is the same as strap 42 shown in FIG. 2A in all respects with the exceptions of the length thereof and additional apertures 48c. It will be appreciated that the length of either of straps 40, 42 of member can be modified to accommodate wall studs of varying thicknesses. In this respect, it is only necessary that the straps 40, 42 be of sufficient length to provide portions which can be wrapped around the ends of the respective studs and secured to the lateral face thereof.

Referring more specifically to the present invention, the preferred embodiment is comprised of twelve-sixteen gauge galvanized steel. Tabs 30, 32 are inclined at 45° angles with respect to planar strip section 18 of body portion 12, to enable installation of reinforcing member 10 at a 45° angle with respect to the adjacent studs S. As will be appreciated, the angle and length thereof are dependent upon the spacing of the adjacent stud and the desired angular position of the reinforcing member therebetween. The present invention is not limited to any specific length or any specific angle. Further, it will be appreciated that the location of apertures 38, 48a, 48b and 48c are dependent on the location of the stud relative to the strap. Preferably such apertures are located on the strap to locate the securing nails in optimum holding positions with respect to the studs.

Figure 3:
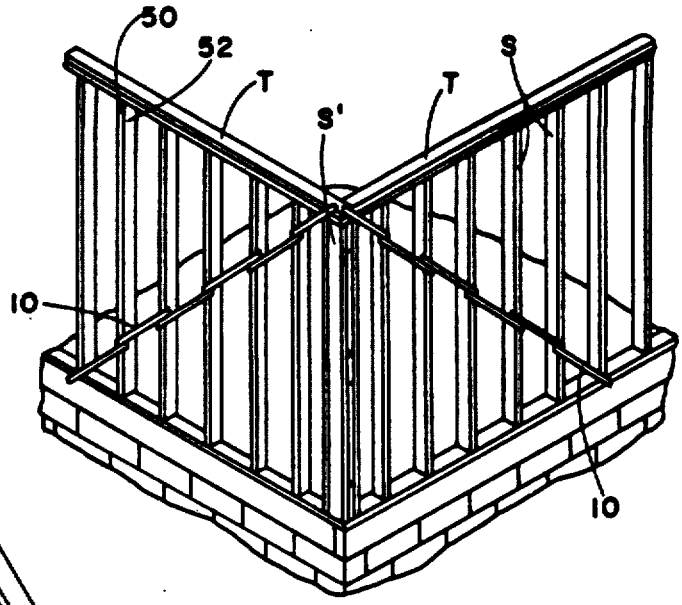
FIG. 3 is a perspective view of a wooden stud corner section illustrating the use of the reinforcing member disclosed in FIG. 1 for a diagonal corner brace; and, FIG. 4 is an elevational view of a wooden stud wall frame illustrating several uses of the reinforcing member disclosed in FIG. 1.
Figure 4:
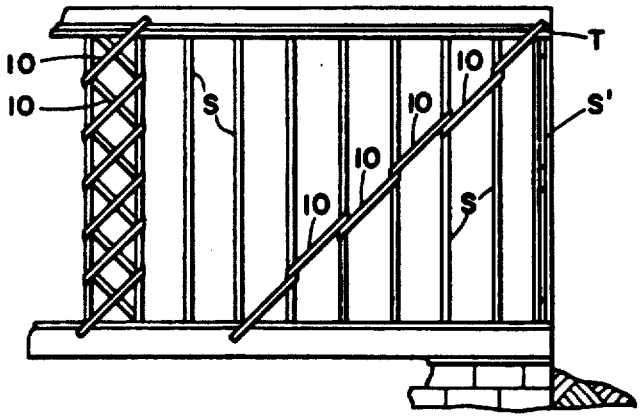

FIGS. 3 and 4 illustrate various uses, and the versatility of, the present invention. As seen in FIG. 3, reinforcing member 10 can be continuously aligned to provide diagonal corner braces in a wall frame structure. The same arrangement of brace 10 is illustrated in elevation in the right side of FIG. 4. The left hand portion of FIG. 4 illustrates a method of providing additional support between adjacent studs by cross bracing the back edges of such studs. It will also be appreciated that openings such as windows or doors in a wall frame structure may be easily braced because of the versatility of the present invention in that the reinforcing member may be placed in any position between adjacent studs. Importantly, in all such applications, installation is simple, easy and fast and does not require skilled carpenters. These beneficial aspects of the present invention provide substantial savings in labor costs. Still further, as best seen in FIGS. 2A, 2B and 2C, body portion 12 of reinforcing member 10 will not interfere with sheet insulation applied over the edges of the adjacent studs. Accordingly, the present invention provides an exceptionally strong brace both in tension and compression, while at the same time enables maximum insulation of the wall section structure through the use of insulation board thereon.

As set forth above, the embodment shown is formed of standard galvanized sheet material. It will be appreciated that other materials of similar strength and formability such as aluminum may be used to form a reinforcing brace according to the concepts of the present invention. In another respect, preformed prongs, conventionally known in the art, could be provided in addition to apertures 38, 48a, 48b and 48c for mounting and holding the member against adjacent studs. These and other modifications and alterations will occur to others upon a reading and understanding of the specification. It is intended that all such modifications or alterations be included insofar as they come within the scope of the invention as claimed or the equivalent thereof.

Having thus defined the invention, the following is claimed:

1. A structural reinforcing member for bracing studs at adjacent spaced locations within a frame of a building wall or the like, said member being comprised of an elongated, generally straight body portion having stud mounting portions at distal ends thereof; said body portion being comprised of first and second planar sections forming a generally L-shaped configuration of said body portion, the width of said first planar section being less than the width of a stud to be mounted at either end of said structural member, said planar sections of said body portion having ends forming said mounting portions; the ends of said first planar section being disposed obliquely with respect to said first planar section, parallel with respect to each other, and in opposite directions with respect to each other, said ends thereby forming outwardly facing, generally flat first mounting surfaces for engagement with opposed faces of adjacent spaced studs, said first mounting portions having apertures through which fasteners may be engaged; the ends of said second planar section forming coplanar extensions thereof, each *coplanar* extension being of a predetermined length greater than [the combined thickness] *a sum total of thicknesses* of studs found at the spaced location *to which said second mounting surfaces are* to be mounted [thereby]; said extensions providing second mounting surfaces in a plane perpendicular to said first mounting surfaces, each second mounting surface being substantially equal in length to said [combined stud thickness] *sum total of thicknesses of studs* at said spaced location *which said second mounting surfaces are* to be mounted [thereby], each second mounting surface having apertures through which fasteners may be engaged; and said extensions being deformable to wrap around said studs such that third mounting surfaces are thereby provided in a plane perpendicular to said second mounting surfaces and parallel to said first mounting surfaces, said third mounting surfaces having apertures through which fasteners may be engaged.

2. A structural reinforcing member as defined in claim 1, wherein each said planar section includes a centrally located reinforcing rib formed in and extending along the length thereof.

3. A structural reinforcing member as defined in claim 2, wherein said apertures are generally aligned with said reinforcing ribs.

4. A structural reinforcing member as defined in claim 1, wherein a mounting surface is provided with said apertures in a staggered array along the length thereof.

*5. A structural reinforcing member for bracing studs at adjacent spaced locations within a frame of a building wall or the like, said member being comprised of an elongated, generally straight body portion having stud mounting portions at distal ends thereof; said body portion being comprised of first and second planar sections forming a generally L-shaped configuration of said body portion, the width of said first planar section being less than the width of a stud to be mounted at either end of said structural member, said planar sections of said body portion having ends forming said mounting portions; the ends of said first planar section being disposed obliquely with respect to said first planar section, parallel with respect to each other, and in opposite directions with respect to each other, said ends thereby forming outwardly facing, generally flat first mounting surfaces for engagement with opposed faces of adjacent spaced studs, said first mounting portions having apertures through which fasteners may be engaged; the ends of said second planar section forming coplanar extensions thereof, each coplanar extension being of a predetermined length extending beyond said first mounting surfaces; said coplanar extensions providing second mounting surfaces in a plane perpendicular to said first mounting surfaces, each second mounting surface having a length substantially equal to or greater than a sum total of stud thicknesses at said spaced location to which said second mounting surfaces are to be mounted, each second mounting surface having apertures through which fasteners may be engaged.*

* * * * *